US010396563B2

(12) United States Patent
Veeraraghavan et al.

(10) Patent No.: US 10,396,563 B2
(45) Date of Patent: Aug. 27, 2019

(54) RENEWABLE ENERGY LOAD MANAGEMENT AND POWER BALANCING SYSTEM AND OPERATION

(71) Applicant: Kripya LLC, Sammamish, WA (US)

(72) Inventors: Vilakkudi G. Veeraraghavan, Sammamish, WA (US); Ramarao Ananathakrishnan, Coimbatore (IN); Muthiam S Balavenkataraman, Coimbatore (IN)

(73) Assignee: Kripya LLC, Vancouver, WA (US)

( * ) Notice: Subject to any disclaimer, the term of this patent is extended or adjusted under 35 U.S.C. 154(b) by 124 days.

(21) Appl. No.: 15/493,040

(22) Filed: Apr. 20, 2017

(65) Prior Publication Data

US 2017/0310114 A1    Oct. 26, 2017

Related U.S. Application Data

(60) Provisional application No. 62/325,888, filed on Apr. 21, 2016.

(51) Int. Cl.
*H02J 3/38* (2006.01)
*H02J 13/00* (2006.01)
*H02J 3/46* (2006.01)

(52) U.S. Cl.
CPC .............. *H02J 3/383* (2013.01); *H02J 3/385* (2013.01); *H02J 3/46* (2013.01); *H02J 13/0096* (2013.01); *Y02E 10/563* (2013.01); *Y02E 10/58* (2013.01); *Y02E 40/72* (2013.01); *Y04S 10/123* (2013.01)

(58) Field of Classification Search
CPC ......... H02J 3/383; H02J 13/0096; H02M 7/44
See application file for complete search history.

(56) References Cited

U.S. PATENT DOCUMENTS

| | | | | |
|---|---|---|---|---|
| 2010/0019574 A1* | 1/2010 | Baldassarre | .............. | H02J 3/14 307/23 |
| 2012/0175955 A1* | 7/2012 | Carralero | ................ | H02J 3/381 307/38 |
| 2013/0088900 A1* | 4/2013 | Park | ........................ | H02J 9/062 363/71 |
| 2017/0187191 A1* | 6/2017 | Kojima | ..................... | H02J 3/38 |

* cited by examiner

*Primary Examiner* — Daniel Kessie
(74) *Attorney, Agent, or Firm* — Lee & Hayes, P.C.

(57) ABSTRACT

A system and process of its operation for monitoring and managing load circuits connected to a renewable energy generation system are disclosed. A programmable load manager circuit continuously monitors the available energy from the generation system and manages the load circuits connected to the system in a manner such that the energy demand from the active load circuits is below the level of available energy. The load circuits can be prioritized and programmed such that the lower priority loads are deactivated prior to the higher priority loads when the available energy from the generation system is not sufficient to satisfy demand from all the active load circuits. When the renewable energy generation system incorporates more than one generator, a load balancing control algorithm, continuously monitoring the load connected to the system and allocates the load in a balanced manner to each of the generators in the system.

19 Claims, 4 Drawing Sheets

RENEWABLE ENERGY LOAD MANAGEMENT AND POWER BALANCING SYSTEM AND OPERATION

CROSS REFERENCE TO RELATED APPLICATIONS

This application is based on and claims priority to U.S. Provisional Application No. 62/325,888, filed on Apr. 21, 2016, entitled, "LOAD MANAGER FOR RENEWABLE ENERGY SYSTEMS," the contents of which are herein incorporated by reference.

FIELD OF THE INVENTION

The present invention relates to load management and balancing systems operating in conjunction with a renewable energy source such as one or more photovoltaic solar energy panels and methods of their operation.

BACKGROUND

Adoption of renewable energy is becoming very popular across the globe. Distributed energy generation employing photovoltaic solar energy systems is gaining popularity as the cost of these systems are coming down. However due to the varying nature of the solar radiation, even during the day time, a majority of the photovoltaic solar energy systems rely on an expensive battery storage subsystem and inefficiently manage the load connected to the system in order to store the direct current (DC) energy which is then converted to usable alternating current (AC) energy using a DC-AC inverter subsystem.

Currently radiation meters located in the site near the solar panels provide an estimate of the available power in a location. However such estimates are not specific to the solar panels and does not take into account various factors that may affect the output of a solar panel.

SUMMARY

Disclosed herein is a load management circuit that is configured to work in conjunction with a solar energy system with one or more photovoltaic generators and associated DC-AC inverters. In the off-grid mode of operation of the system, the load management circuit is configured to constantly monitor the power demand from the active load circuits and the available power from the photo voltaic generators and manage the active load circuits in a manner such that the power demand from the active loads does not exceed the available power.

Also disclosed is a programmable load balancing algorithm residing in one of the DC-AC inverters designated as the master to enable sharing of the load by all the DC-AC inverters in a balanced manner through communication with the remaining DC-AC inverters in the array. During the off-grid mode of operation of the solar energy system, the algorithm computes the total power demand from the system and allocates a power limit for each one of the DC-AC inverters in the system and communicates the limit to each one of the DC-AC inverters through power-line communication.

This summary is provided to introduce a selection of concepts in a simplified form described below in the detailed description. This summary is not intended to identify key features or essential features of the claimed subject matter, nor is it intended to be used to limit the scope of claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

In the following detailed description of embodiments, specific detailed examples are given in order to provide an understanding of the embodiments. However, it is to be appreciated that the embodiments may be practiced without these specific details. Furthermore, the techniques and systems disclosed herein are limited to the described embodiments. Numerous modifications, changes, variation, substitutions and equivalents will be apparent to those skilled in the art.

Figure 1:
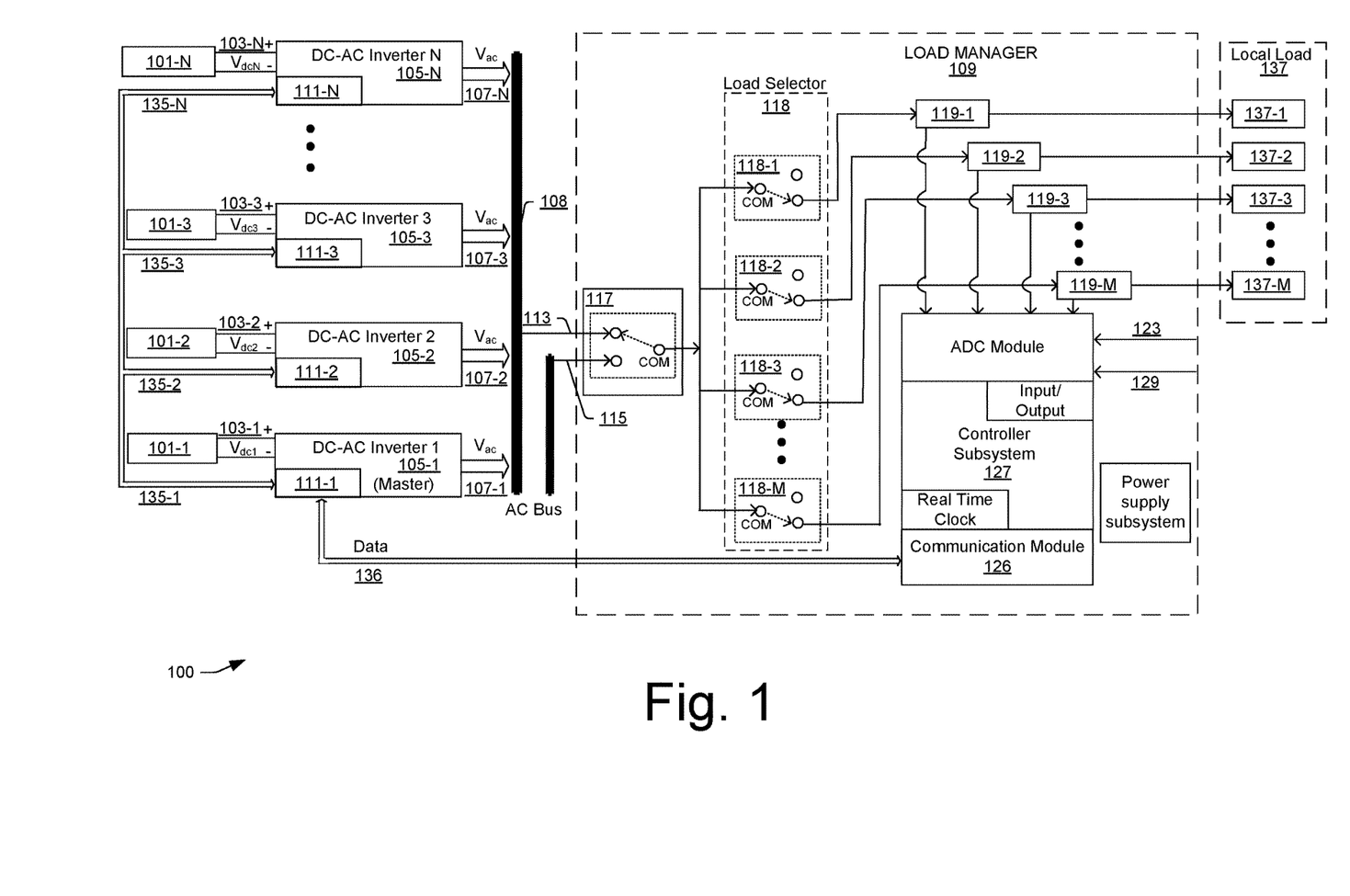
FIG. 1 is a schematic block diagram of an example photovoltaic (PV) solar energy system with multiple PV sources and associated DC-AC inverters working in off-grid mode of operation in conjunction with a load manager.

FIG. 1 is a schematic block diagram of an example of an photovoltaic (PV) solar energy system 100 with multiple PV sources 101-1, 101-2, 101-3, . . . 101-N and associated DC-AC inverters 105-1, 105-2, 105-3, . . . 105-N working in off-grid mode of operation, in conjunction with Load Manager circuit 109. As an example the photovoltaic solar energy system 100 may be a 3000 Watt roof top solar energy system consisting of ten 300 watt solar panels each connected to a 300 watt DC-AC inverter.

The DC voltage output from the PV sources $V_{dc1,2,3\ldots N}$ are connected to the input 103-1,2,3 . . . N of the DC-AC inverters 105-1,2,3 . . . N. In the off-grid mode of operation of the solar energy system, the AC output 107-1,2,3 . . . N are connected to the off-grid voltage $V_{ac}$ bus 108.

The communication modules 111-1,2,3 . . . N of the DC-AC inverters 105-1,2,3 . . . N are interconnected via data links 135-1,2,3 . . . N and are in turn connected to the communication module 126 of the of the controller subsystem 127 of the load manager circuit 109 via the data link 136.

The controller subsystem 127 in the load manager circuit 109 is configured to sense the presence or absence of grid voltage 123, and/or sense off-grid voltage 129, and to receive inputs from the AC load current sensors 119-1,2,3 . . . M, and input DC voltage values $V_{dc1,2,3 \ldots N}$ from the from the DC-AC inverters 105-1,2,3 . . . N.

When the grid voltage $V_{grid}$ is present, the load manger circuit is connected to the grid via link 115 and selector relay 117. In this case the load manager simply acts like a pass-through and allows all the load segments 137 to be connected to the grid.

When the grid voltage $V_{grid}$ is absent, the load manger circuit operates in the off-grid mode. In the off-grid mode of operation of the solar energy system, the off-grid voltage $V_{ac}$ bus 108 is connected to the selector relay 117 through connector 113, and the selector relay 117 is connected to the load selector relays 118-1,2,3 . . . M of the load selector 118. The load selector relays 118-1,2,3 . . . M are associated with the load segments 137-1,2,3 . . . M respectively. Each of the load segments 137-1,2,3 . . . M may be assigned a priority which may be stored in the controller subsystem 127 of the load management circuit 109. The AC load current sensors 119-1,2,3 . . . M are configured to measure the AC current in the load segments 137-1,2,3 . . . M respectively and transmit the values of measured AC current to the controller subsystem 127.

One of the DC-AC inverters 105-1,2,3 . . . N may be designated as the master (for example 105-1 in this example). The designated master is configured to receive the AC current output from each of the other DC-AC inverters 105-2,3 . . . N, compute the total power demanded from the PV solar energy system 100 and allocate the power demand to each of the DC-AC inverters 105 in a balanced manner by setting a current limit for each one of the other DC-AC inverters 105-2,3 . . . N and communicating the current limit to the other DC-AC inverters 105-2,3 . . . N via the data links 135-1,2,3 . . . N.

Figure 2:
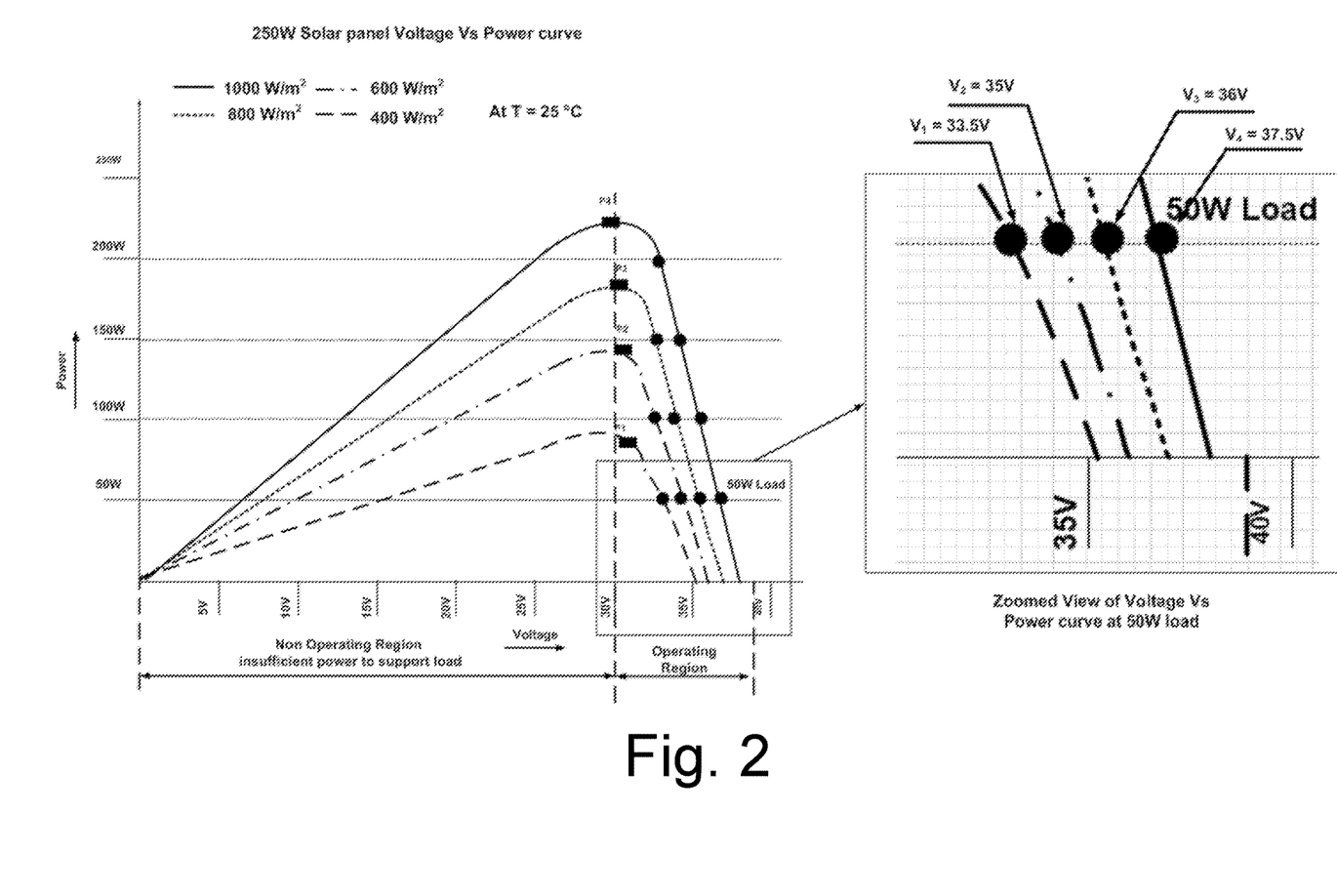
FIG. 2 is an example power Vs. voltage diagram for a solar photo voltaic panel at 25 Deg. C. at different radiation levels with details of an example method of computing available power based on power drawn and the panel voltage measurement at any given time.

FIG. 2 is an example power Vs. voltage diagram for a solar photo voltaic panel at 25 Deg. C. at different radiation levels with details of an example process of computing available power based on power drawn and the panel voltage measurement at any given time. Characteristics of a panel with a peak power capacity of 250 watts is presented in this example.

The horizontal axis represents the DC voltage output of the solar panel, for example the solar panel may be a 60 or 72 cell polycrystalline solar module representing any one of the PV sources 101-1, 101-2, 101-3, . . . 101-N in the example photovoltaic (PV) solar energy system 100, which ranges from 0 to 40 Volts DC in this example. The vertical axis represents the corresponding solar power in watts that can be generated from the solar panel at different solar radiation levels ranging from 400 W/m² (watts/meter squared) to 1000 W/m² in this example. Photovoltaic solar energy systems are designed to operate in the voltage range to the right of the DC output voltage corresponding to the peak power points (P1, P2, P3 and P4 in this example). The DC output voltage range to the left of the peak power points (P1, P2, P3 and P4 in this example) is considered a non-operating region as shown in FIG. 2.

Focusing on the operating range (30-40 Volt in this example), for a given radiation level, as the power drawn by the load connected to the solar panel increases, the DC output voltage decreases along the Power Vs. Voltage curve corresponding to the radiation level. In the case of a fully characterized solar panel (Power vs. Voltage curves at different radiation levels), a predictive algorithm may predict the total available power from the solar panel employing the measured DC voltage of the panel at a known level of power drawn from the panel by the connected load.

The illustration of the "Zoomed view of voltage vs. Power curve at 50 W load" in FIG. 2 is an example of the predictive algorithm for calculating the available power from the solar panel at any given time based on the Panel DC voltage and the power drawn by the load connected to the panel at that time, taking into account various factors affecting the panel performance. In this example where the power drawn by the load is 50 Watts, a panel voltage of 33.5 Volts establishes a radiation level of 400 Watts/meter squared and a total available power of P1 equivalent to 90 Watts. Similarly, a panel voltage of 35 Volts will represent a total available power of 140 Watts (P2 in FIG. 2) a panel voltage of 36 Volts will represent a total available power of 180 Watts (P3 in FIG. 2), and a panel voltage of 37.5 Volts will represent a total available power of 220 Watts (P4 in FIG. 2).

Table 1 is an example of Power available computed employing the predictive algorithm and real time data of Solar panel voltage and the load power drawn at four different power output levels drawn from the solar panel.

TABLE 1

Available Power Computed using predictive Algorithm

| Solar panel output power Watts | Solar Panel output DC Voltage Volts | Solar Panel Available Power Watts |
|---|---|---|
| 50 | 33.5 | 90 |
| | 35 | 140 |
| | 36 | 180 |
| | 37.5 | 225 |
| 100 | 33.5 | 140 |
| | 35 | 180 |
| | 36.5 | 225 |
| 150 | 34.5 | 180 |
| | 36 | 225 |
| 200 | 35 | 225 |

From the data available in the look up table, it is possible to derive an empirical relationship between total power available and solar panel voltage and power drawn from the panel at any given time. In the case of look up tables, interpolation techniques can be used with the values from the look up tables to get more accurate values for the available power from the PV source.

Such lookup tables or empirical formula representing the look up table for each of the solar PV sources 101-1,2,3 . . . N may be computed and stored in the DC-AC inverters 105-1,2,3 . . . N or the controller subsystem 127 of load manager circuit 109 associated with the solar energy system 100, and these lookup tables or empirical formula can be readily used to determine the available power $P_{AV-i}$ for each of the PV source "i". The total available power for the PV solar energy system 100 $P_{AV-Total}$ may be computed by summation of the available power from each PV source 101-1,2,3 . . . N ($P_{AV-Total}=P_{AV-1}+P_{AV-2}+P_{AV-3}+ \ldots P_{AV-N}$).

Figure 3:
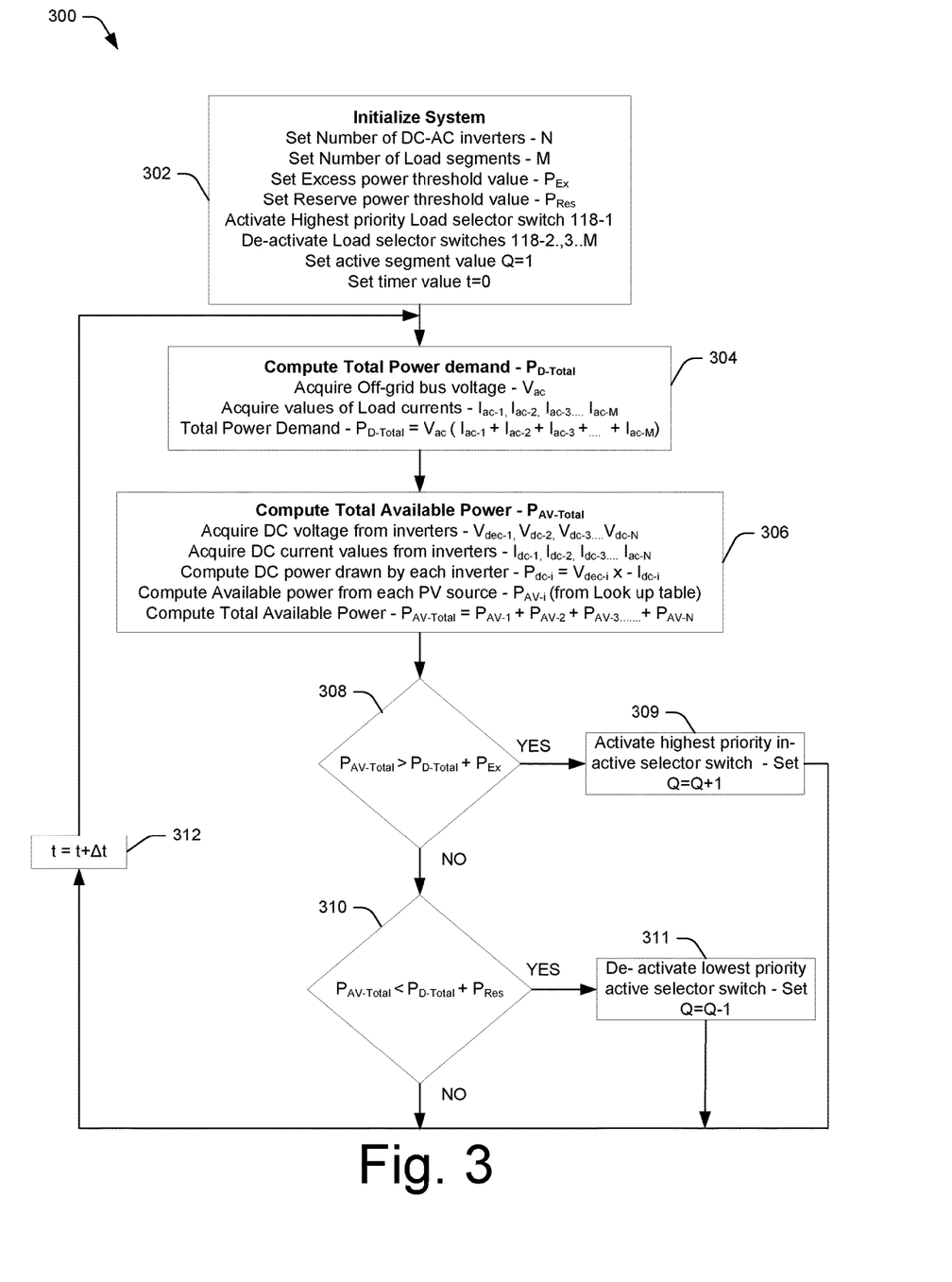
FIG. 3 is a flow diagram of an illustrative process for the off-grid operation of the load manager circuit in order to constantly monitor the power demand from the active load circuits and the available power from the photo voltaic generators and manage the active load circuits in a manner such that the power demand from the active loads does not exceed the available power.
Figure 4:
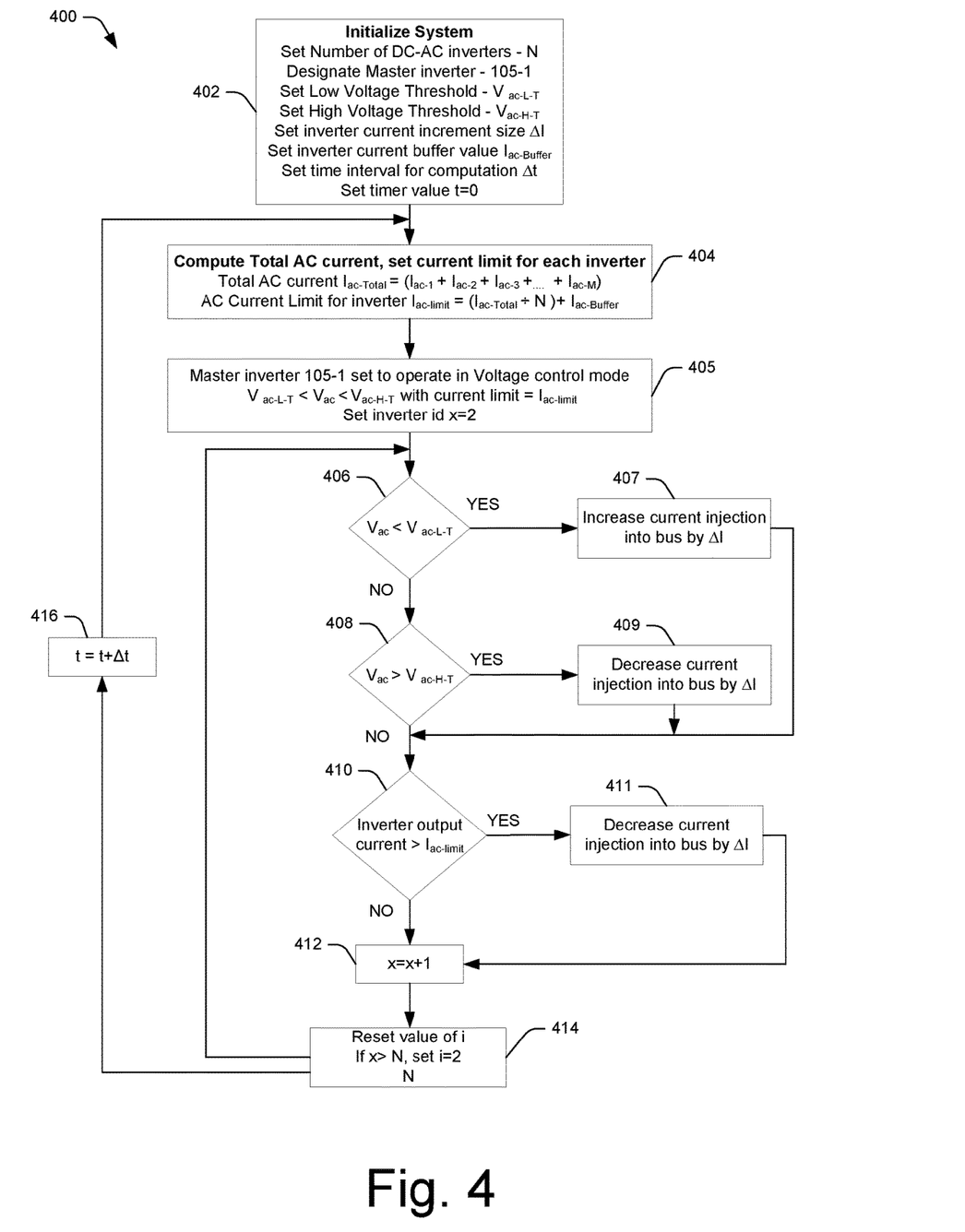
FIG. 4 is a flow diagram of an illustrative process for the off-grid operation of the photo voltaic solar energy system through which the system operates within a prescribed range(s) of output voltage and the inverters in the system share the load in a balanced manner.

FIGS. 3 and 4 illustrate example processes that may be carried out to perform the techniques described herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

FIG. 3 is a flow diagram of an illustrative process 300 for the off-grid operation of the load manager circuit 109 in order to continuously monitor the power available from solar energy sources 101-1,2, 3 . . . N connected to the DC-AC inverters 105-1,2,3 . . . N and power demand from the active loads 137-1,2,3 . . . M connected to the load manager circuit 109, and actively managing the loads such that total demanded power $P_{D-Total}$ is less than the total available power $P_{AV-Total}$.

In step 302 the system initialization parameters are set to appropriate values. The number of DC-AC inverters in the system is set to value N, the number of load segments is set to value M. An excess power threshold value $P_{Ex}$ and a reserve power threshold value $P_{Res}$ are set to appropriate values. As an example for a Photovoltaic solar energy system of 3000 Watts capacity, N may be set to 10 (each inverter with 300 W capacity, for example), M may be set to 4 (the load circuits segmented into 4 segments), the excess power threshold $P_{Ex}$ may be set to 500 Watts, and the reserve power threshold value $P_{Res}$ may be set to 100 Watts. At the system start-up, the highest priority load segment may be set to active status through selector switch 118-1 and all other segments may be set to inactive status though selector switches 118-2,3, . . . M. Set the active segment value Q–1 and set timer value t=0.

In step 304 the total power demand $P_{D-Total}$ from the active load segments is computed. For this computation the off-grid bus voltage $V_{ac}$, AC current sensor 119-1,2,3 . . . M output values $I_{ac-1}$, $I_{ac-2}$, $I_{ac-3}$, . . . $I_{ac-M}$ are acquired and total power demand is computed as $P_{D-Total}=V_{ac}(I_{ac-1}+I_{ac-2}+I_{ac-3}+ \ldots +I_{ac-M})$. For the example system, $V_{ac}$ may be equal to 220 Volts, and $(I_{ac-1}+I_{ac-2}+I_{ac-3}+ \ldots +I_{ac-M})$ value may be equal to 4 amps, representing a total power demand $P_{D-Total}$ equal to 880 Watts.

In step 306 the total available power $P_{AV-Total}$ for the system is computed. The DC voltage input for each inverter $V_{dc-1}$, $V_{dc-2}$, $V_{dc-3}$ . . . $V_{dc-N}$, is combined with the corresponding DC current values $I_{dc-1}$, $I_{dc-2}$, $I_{dc-3}$, . . . $I_{dc-N}$ and used to compute the DC power drawn from each PV source $P_{dc-1}$, $P_{dc-2}$, $P_{dc-3}$ . . . $P_{dc-N}$. Using the power and the associated DC voltage values, the available power from each PV source $P_{AV-1}$, $P_{AV-2}$, $P_{AV-3}$ . . . $P_{AV-N}$ is computed from the look up table (e.g., Table 1), as discussed in the previous section. Total available power for the system is then computed as $P_{AV-Total}=P_{AV-1}+P_{AV-2}+P_{AV-3} \ldots +P_{AV-N}$. For the example system, $P_{AV-Total}$ may be equal to 1200 Watts.

In step 308 systems ability to activate a load segment that is not currently active is determined based on a comparison of total available power $P_{AV-Total}$ with the total power demand $P_{D-Total}$+excess power threshold, $P_{Ex}$. If it is determined, based on the comparison at step 308, that $P_{AV-Total}$ is greater than $P_{D-Total}+P_{Ex}$, then the process 300 follows the "yes" route from step 308 to step 309 where selector switch with the highest priority among the ones which are currently inactive will be activated and the corresponding load segment connected to the system output.

If, at step 308, $P_{AV-Total}$ is not greater than $P_{D-Total}+P_{Ex}$, then the process 300 follows the "no" route from step 308 to step 310, where the system ability to de-activate a load segment that is currently active is determined based on a comparison of the total available power $P_{AV-Total}$ with the total power demand $P_{D-Total}$+a reserve power threshold, $P_{Res}$. If it is determined, based on the comparison at step 310, that $P_{AV-Total}$ is less than $P_{D-Total}+P_{Res}$, then process 300 follows the "yes" route from step 310 to step 311 where the selector switch with the lowest priority among the ones which are currently active will be deactivated and the corresponding load segment disconnected from the system output.

Either following the "no" route from step 310, after activating the highest priority selector switch at step 309, or after deactivating the lowest priority selector switch at step 311, the process 300 proceeds to step 312 to repeat the steps 304 to 310 in periodic intervals of time Δt in order to continuously monitor the power available from solar energy sources 101-1,2,3 . . . N connected to the DC-AC inverters 105-1,2,3 . . . N and power demand from the active loads 137-1,2,3 . . . M connected to the load manager circuit 109, and actively managing the loads such that total demanded power $P_{D-Total}$ is less than the total available power $P_{AV-Total}$.

FIG. 4 is a flow diagram of an illustrative process 400 for the off-grid operation of the Photo voltaic solar energy system 100 through which the system operates within a prescribed range of output voltage $V_{ac-L-T}$ and $V_{ac-H-T}$ and the inverters 105 in the system share the load in a balanced manner.

In step 402 the system initialization parameters are set to appropriate values. The number of DC-AC inverters 105 in the system is set to value N, and one of the DC-AC inverters 105-1 is designated as the master. A low voltage threshold $V_{ac-L-T}$ value and a high voltage threshold value $V_{ac-H-T}$ are set. As an example $V_{ac-L-T}$ may be set to 205 volts and $V_{ac-H-T}$ may be set to 235 volts. In this step, a current increment or decrement size ΔI is set. As an example ΔI may be set to 25 milli amps. Set inverter current buffer value $I_{ac}$-Buffer. As an example the value of $I_{ac-Buffer}$ may be set as 100 milli amps. A time interval Δt at which the balancing process is repeated is also set at this step. As an example the value of Δt may be set as 400 milli seconds. Set initial timer value t=0.

In step 404 total AC current drawn $I_{ac-Total}$ by the loads is computed as the sum of current values $I_{ac-1}$, $I_{ac-2}$, $I_{ac-3}$, . . . $I_{ac-M}$ from the current sensors 119-1, 119-2, 119-3 . . . 119-M respectively. This total AC current value $I_{ac-Total}$ is allocated to each inverter as a current limit value $I_{ac-limit}$. As an example the total AC current value $I_{ac-Total}$ may be allocated substantially equally to each of the N inverters 105 in the system.

In step 405, the inverter 105-1 designated as the master is set to operate in the voltage control mode within the operating voltage range of $V_{ac-L-T}<V_{ac}<V_{ac-H-T}$ and the current limit value $I_{ac-limit\ set}$ to $(I_{ac-Total}\div N.)+I_{ac-Buffer}$. Examples of operating in the voltage control mode is described in U.S. Pat. No. 9,444,366, entitled "DUAL MODE MICRO-INVERTER SYSTEM AND OPERATION," and U.S. Pat. No. 9,590,528, entitled "DUAL MODE DC-AC INVERTER SYSTEM AND OPERATION," the contents of which are herein incorporated by reference.

In step 406 the AC bus voltage $V_{ac}$ is compared with low voltage threshold $V_{ac-L-T}$ value. If it is determined, based on the comparison at step 406 $V_{ac}$ is less than $V_{ac-L-T}$ then the process 400 follows the "yes" route from step 406 to 407, where the current injected by inverter "x" is incremented by value ΔI.

If it is determined, based on the comparison at step 406 $V_{ac}$ is not less than $V_{ac-L-T}$ then the process 400 follows the "no" route from step 406 to 408.

In step 408 the AC bus voltage $V_{ac}$ is compared with high voltage threshold $V_{ac-H-T}$ value. If it is determined, based on the comparison at step 408 $V_{ac}$ is greater than $V_{ac-H-T}$ then the process 400 follows the "yes" route from step 408 to 409 If where the current injected by inverter "x" is decreased by value $\Delta I$.

If it is determined, based on the comparison at step 408 $V_{ac}$ is not greater than $V_{ac-H-T}$ then the process 400 follows the "no" route from step 408 to 410.

In step 410 the output current of inverter "x" is compared with current limit $I_{ac-limit}$. it is determined, based on the comparison at step 410 output current of inverter "x" is greater than $I_{ac-limit}$ then the process 400 follows the "yes" route from step 410 to 411 where the current injected by inverter "x" is decreased by value $\Delta I$. it is determined, based on the comparison at step 410 output current of inverter "x" is not greater than $I_{ac-limit}$ then the process 400 follows the "no" route from step 410 to 412.

In step 412 the inverter ID value "x" is incremented by one. In step 414 boundaries for the value of "x" set as between 2 and N.

Steps 406-414 are executed on a continuous basis in order for the system 100 to adequately support the active load segments and maintain the off-grid AC bus voltage between low voltage threshold $V_{ac-L-T}$ and high voltage threshold $V_{ac-H-T}$.

Step 416 is an indication for repeating the steps 404 to 414 in periodic intervals of time $\Delta t$ in order to periodically compute the total AC current $I_{ac-Total}$ and set the appropriate current limits $I_{ac-limit}$ for all the inverters in order for the system to function in a balanced manner.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A solar energy system comprising:
one or more direct current to alternating current (DC-AC) inverters;
one or more solar energy sources coupled to the one or more DC-AC inverters; and
a programmable load manager circuit configured to monitor an amount of power available from the one or more solar energy sources and an amount of power demand from one or more active loads of a plurality of loads connected to the programmable load manager circuit, and to manage the plurality of loads such that the amount of power demand is less than the amount of power available,
wherein the programmable load manager circuit is configured to monitor the amount of power available from the one or more solar energy sources by:
determining an amount of power drawn by the one or more active loads from individual ones of the one or more solar energy sources as a computed amount of power;
determining an amount of voltage output by individual ones of the one or more solar energy sources as a measured amount of voltage; and
looking up an amount of power available from individual ones of the one or more solar energy sources in a look up table using the computed amount of power and the measured amount of voltage;
wherein the look up table specifies:
multiple first values for an amount of power output by an individual solar energy source; and
corresponding to each value of the multiple first values:
multiple second values for an amount of voltage output by the individual solar energy source; and
multiple third values for an amount of power available from the individual solar energy source.

2. The solar energy system of claim 1, wherein the programmable load manager circuit is further configured to segment the plurality of loads into multiple segments, and to assign a priority to individual ones of the multiple segments.

3. The solar energy system of claim 2, wherein the programmable load manager circuit is configured to segment the plurality of loads by activating or deactivating individual switches of multiple switches corresponding to the multiple segments.

4. The solar energy system of claim 1, wherein the programmable load manager circuit is further configured to receive one or more sensor inputs indicating at least one of:
a presence or an absence of grid voltage and a value of the grid voltage if the one or more sensor inputs indicate the presence of the grid voltage;
a presence or an absence of off-grid bus voltage and a value of the off-grid bus voltage if the one or more sensor inputs indicate the presence of the off-grid bus voltage;
a load current being delivered to each of the one or more active loads; or
a DC input voltage value of each of the one or more DC-AC inverters.

5. The solar energy system of claim 1, wherein the programmable load manager circuit is configured to compute the amount of power drawn by the one or more active loads from the individual ones of the one or more solar energy sources as a function of:
one or more DC voltage values associated with individual ones of the one or more DC-AC inverters; and
one or more DC current values associated with the individual ones of the one or more DC-AC inverters.

6. The solar energy system of claim 1, wherein:
the one or more solar energy sources comprise multiple solar panels; and
the programmable load manager circuit is configured to monitor the amount of power available from the one or more solar energy sources by:
looking up, in the look up table, the amount of power available from each solar panel of the multiple solar panels; and
summing the amounts of power available from each solar panel to determine the amount of power available from the one or more solar energy sources as a total amount of power available from the multiple solar panels.

7. The solar energy system of claim 1, wherein the programmable load manager circuit is configured to monitor the amount of power demand from the one or more active loads by:
determining an off-grid bus voltage;
determining one or more AC current values output by one or more AC load current sensors associated with the one or more active loads; and
computing the amount of power demand from the one or more active loads as a function of the off-grid bus voltage and the one or more AC current values.

8. A system comprising:
multiple direct current to alternating current (DC-AC) inverters;
multiple solar energy sources coupled to the multiple DC-AC inverters; and
a programmable load manager circuit coupled to a plurality of loads, the programmable load manager circuit configured to:
  determine an amount of power demand from one or more active loads of the plurality of loads;
  for each solar energy source of the multiple solar energy sources:
    determine an amount of power drawn by the one or more active loads from the solar energy source as a computed amount of power;
    determine an amount of voltage output by the solar energy source as a measured amount of voltage; and
    look up an amount of power available from the solar energy source in a look up table using the computed amount of power and the measured amount of voltage;
  wherein the look up table specifies:
    multiple first values for an amount of power output by an individual solar energy source; and
    corresponding to each value of the multiple first values:
      multiple second values for an amount of voltage output by the individual solar energy source; and
      multiple third values for an amount of power available from the individual solar energy source;
  determine an amount of power available from the multiple solar energy sources as a function of the amounts of power available from each solar energy source, as determined from the look up table; and
  manage the plurality of loads such that the amount of power demand does not exceed the amount of power available from the multiple solar energy sources.

9. The system of claim 8, wherein the programmable load manager circuit is further configured to segment the plurality of loads into multiple load segments, and to assign a priority to individual ones of the multiple load segments.

10. The system of claim 9, wherein the programmable load manager circuit is further configured to manage the plurality of loads by at least one of activating or deactivating a load segment of the multiple load segments based on the priority assigned to individual ones of the multiple load segments.

11. The system of claim 8, wherein the programmable load manager circuit is further configured to receive one or more sensor inputs indicating at least one of:
  a presence or an absence of grid voltage and a value of the grid voltage if the one or more sensor inputs indicate the presence of the grid voltage;
  a presence or an absence of off-grid bus voltage and a value of the off-grid bus voltage if the one or more sensor inputs indicate the presence of the off-grid bus voltage;
  a load current being delivered to each of the one or more active loads; or
  a DC input voltage value of each of the multiple DC-AC inverters.

12. The system of claim 8, wherein the programmable load manager circuit is configured to compute the amount of power drawn by the one or more active loads from the solar energy source as a function of:
  a DC voltage value associated with a corresponding DC-AC inverter; and
  a DC current value associated with the corresponding DC-AC inverter.

13. The system of claim 8, wherein the multiple solar energy sources comprise multiple solar panels.

14. The system of claim 8, wherein the programmable load manager circuit is configured to determine the amount of power demand from the one or more active loads by:
  determining an off-grid bus voltage;
  determining one or more AC current values output by one or more AC load current sensors associated with the one or more active loads; and
  computing the amount of power demand from the one or more active loads as a function of the off-grid bus voltage and the one or more AC current values.

15. A method implemented by a solar energy system, comprising:
  determining, by a programmable load manager circuit of the solar energy system, an amount of power demand from one or more active loads of a plurality of loads coupled to the programmable load manager circuit;
  determining, by the programmable load manager circuit, an amount of power drawn by the one or more active loads from a solar energy source of one or more solar energy sources as a computed amount of power;
  determining, by the programmable load manager circuit, an amount of voltage output by the solar energy source as a measured amount of voltage;
  looking up an amount of power available from the solar energy source in a look up table using the computed amount of power and the measured amount of voltage;
  wherein the look up table specifies:
    multiple first values for an amount of power output by an individual solar energy source; and
    corresponding to each value of the multiple first values:
      multiple second values for an amount of voltage output by the individual solar energy source; and
      multiple third values for an amount of power available from the individual solar energy source; and
  managing, by the programmable load manager circuit, the plurality of loads such that the amount of power demand does not exceed a total amount of power available from the one or more solar energy sources, the total amount of power available from the one or more solar energy sources based at least in part on the amount of power available from the solar energy source.

16. The method of claim 15, wherein the one or more solar energy sources comprise multiple solar energy sources, the solar energy source is a first solar energy source of the multiple solar energy sources, and the amount of power available from the solar energy source is a first amount of power available from the first solar energy source, the method further comprising:
  determining a second amount of power drawn by the one or more active loads from a second solar energy source as a second computed amount of power;
  determining a second amount of voltage output by the second solar energy source as a second measured amount of voltage;
  looking up a second amount of power available from the second solar energy source in the look up table using the second computed amount of power and the second measured amount of voltage; and determining the total amount of power available as a total amount of power available from the multiple solar energy sources based at least in part on the first amount of power available from the first solar energy source and the second amount of power available from the second solar energy source.

17. The method of claim 15, further comprising:

segmenting the plurality of loads into multiple load segments; and assigning a priority to individual ones of the multiple load segments, wherein the managing the plurality of loads comprises at least one of activating or deactivating a load segment of the multiple load segments based on the priority assigned to individual ones of the multiple load segments.

18. The method of claim 15, further comprising receiving one or more sensor inputs indicating at least one of:

a presence or an absence of grid voltage and a value of the grid voltage if the one or more sensor inputs indicate the presence of the grid voltage;

a presence or an absence of off-grid bus voltage and a value of the off-grid bus voltage if the one or more sensor inputs indicate the presence of the off-grid bus voltage;

a load current being delivered to each of the one or more active loads; or a direct current (DC) input voltage value of a direct current to alternating current (DC-AC) inverter coupled to the solar energy source.

19. The method of claim 15, further comprising determining the amount of power drawn by the one or more active loads from the solar energy source as a function of:

a direct current (DC) voltage value associated with a direct current to alternating current (DC-AC) inverter coupled to the solar energy source; and a DC current value associated with the DC-AC inverter.

* * * * *